(12) United States Patent
Demick

(10) Patent No.: US 6,460,922 B1
(45) Date of Patent: Oct. 8, 2002

(54) FLEXIBLE SEAT SYSTEM

(76) Inventor: Robert L. Demick, 24891 Warrington, Eastpointe, MI (US) 48021

( * ) Notice: Subject to any disclaimer, the term of this patent is extended or adjusted under 35 U.S.C. 154(b) by 0 days.

(21) Appl. No.: 09/509,746

(22) PCT Filed: Oct. 2, 1998

(86) PCT No.: PCT/US98/20818
§ 371 (c)(1),
(2), (4) Date: Jun. 8, 2000

(87) PCT Pub. No.: WO99/17953
PCT Pub. Date: Apr. 15, 1999

Related U.S. Application Data

(60) Provisional application No. 60/060,739, filed on Oct. 2, 1997.

(51) Int. Cl.[7] ................................. A47C 9/06
(52) U.S. Cl. ................... 297/14; 297/344.1; 296/65.11; 296/65.13
(58) Field of Search .................... 297/13, 14, 344.1; 296/65.01, 65.05, 65.11, 65.13

(56) References Cited

U.S. PATENT DOCUMENTS

| | | | |
|---|---|---|---|
| 4,458,939 A | * | 7/1984 | Hohn ...................... 296/65.11 |
| 4,740,030 A | * | 4/1988 | Nordskog ................... 297/14 |
| 4,993,666 A | * | 2/1991 | Baymark et al. ............. 297/13 |
| 5,632,521 A | | 5/1997 | Archambault et al. |
| 5,711,505 A | | 1/1998 | Nemoto |
| 5,839,773 A | | 11/1998 | Ban et al. |

* cited by examiner

Primary Examiner—Anthony D. Barfield
(74) Attorney, Agent, or Firm—Foley & Lardner

(57) ABSTRACT

A flexible seating system (10) for a vehicle (20) which includes a side wall track (24) mounted to the vehicle side wall (22) and extending longitudinally of the vehicle. A cross track (30) extends laterally across the vehicle. A seat back (40) of the vehicle seat (18) is coupled to the side wall track and cross track by slidable bearing (58) devices so that the seat back can be moved from a laterally extending forward facing position to a stowed position alongside the vehicle side wall. The seat bottom (42) is rotatably coupled to the seat back by a hinge (44) mechanism and can extend generally horizontally from the seat back to be rotated to an upright stowed position overlying the seat back. A support extends from the seat bottom to the vehicle floor (57) to support the seat bottom in a spaced relationship above the floor.

26 Claims, 3 Drawing Sheets

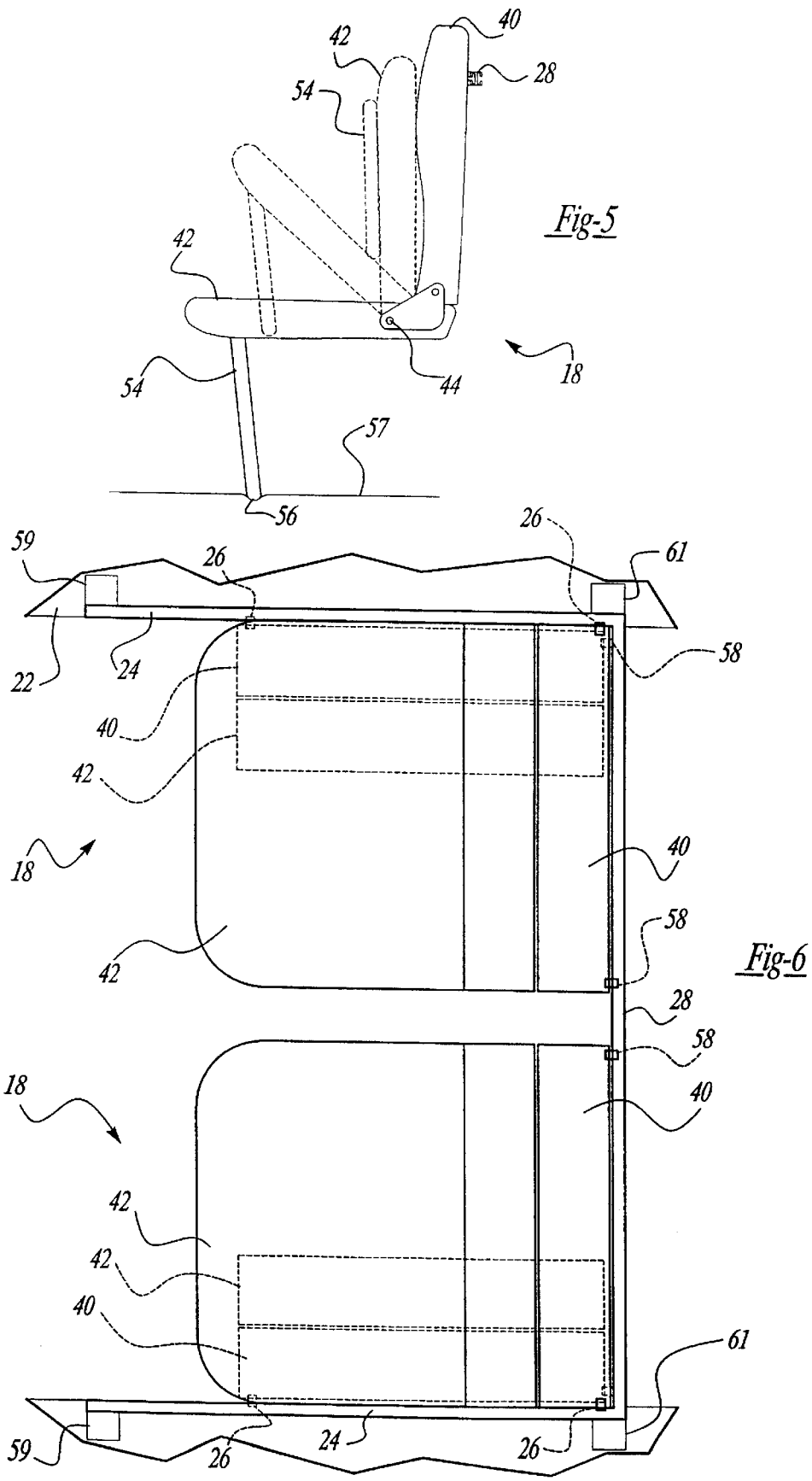

FLEXIBLE SEAT SYSTEM

This application claims the benefit of provisional application 60/060,739, filed Oct. 2, 1997.

BACKGROUND OF THE INVENTION

The present invention relates generally to vehicle seating and in particular to a seat system that provides flexibility in the use of the vehicle between transporting passengers and carrying cargo.

Vehicle manufacturers are constantly striving to increase the usefulness of motor vehicles. Doing so enables consumers to perform a greater variety of functions with their vehicles. In many vehicles, the rear seating area is used more often for carrying cargo than it is for carrying passengers. This is particularly true in multipurpose passenger vehicles (MPV's) and sport utility vehicles (SUV's) having three rows of seats. The third row seat may be used for passengers in the few instances when a large number of passengers are being transported at a given time. Much of the time, the area occupied by the third row seat is used for carrying cargo. Thus, it is desirable to provide a seat system for vehicles, particularly the third row seat, which can quickly and easily be changed from carrying passengers to carrying cargo in the vehicle.

One way to achieve flexibility between passengers and cargo is to provide seats that can be removed from the vehicle to enable cargo to be carried. A difficulty with removable seats is that the seats are often heavy and thus difficult to lift and maneuver out of the vehicle. Accordingly, a need exists for a seat that can be conveniently stored within the vehicle and occupy a minimal amount of space to maximize the cargo carrying capability of the vehicle.

SUMMARY OF THE INVENTION

The present invention provides a flexible seating system in which a track is mounted to the vehicle side wall and extends fore and aft, i.e. longitudinally, of the vehicle. A cross vehicle track extends laterally across the vehicle from the rear end of the side wall track. The seat system includes a seat back which has a first use position in the vehicle in which the seat back is upright and laterally extending across the vehicle, forming a front facing seating surface. An outboard edge of the seat back is adjacent the vehicle side wall and the side wall track. The seat back is coupled to the side wall track by a first bearing device for sliding motion along the length of the side wall track. The seat back has a second bearing device at an inboard edge of the seat back which is coupled to the cross vehicle track for sliding movement laterally of the vehicle, along the cross vehicle track. The seat back is movable from its first use position in which it faces forward in the vehicle to a stowed position along the vehicle side wall in which the seat back faces laterally, or sideways, in the vehicle.

A seat bottom is provided which has a rear end pivotally attached to the lower end of the seat back. The seat bottom has a generally horizontal use position extending from the seat back in which the seat bottom forms a generally horizontal seating surface. The seat bottom can rotate from the use position to an upright stowed position overlying the seating surface of the seat back. When the seat back is in its stowed position along the vehicle side wall and the seat bottom is rotated to its upright stowed position, the third row seating area of the vehicle is substantially open for carrying cargo. When the seat back is in the stowed position, the seat bottom can be rotated down to its extending use position to form a side facing seat within the vehicle. Thus, the stowed position of the seat back may also be referred to as a side facing use position.

An underseat stanchion is pivotally coupled to the seat bottom near its front end. The stanchion extends downward to the floor of the vehicle and is coupled to a mount on the vehicle floor. When the seat bottom is rotated to its upright stowed position, the stanchion pivots at the upper end of the stanchion to lie flat against the lower surface of the upright seat bottom.

In a typical embodiment, a pair of identical seats will be provided in the vehicle to form the third seating row. Each of the seats is movable to opposite side walls of the vehicle.

Further objects, features and advantages of the invention will become apparent from a consideration of the following description and the appended claims when taken in connection with the accompanying drawings.

BRIEF DESCRIPTION OF THE DRAWINGS

FIG. 5 is a side view of the seat showing the seat in a forward facing use position and with the seat bottom folded upright; and FIG. 6 is a plan view similar to FIG. 3 showing two seats, each coupled to opposite side walls of the vehicle for forming a row of seats across the vehicle.

DETAILED DESCRIPTION OF THE PREFERRED EMBODIMENT

Figure 1:
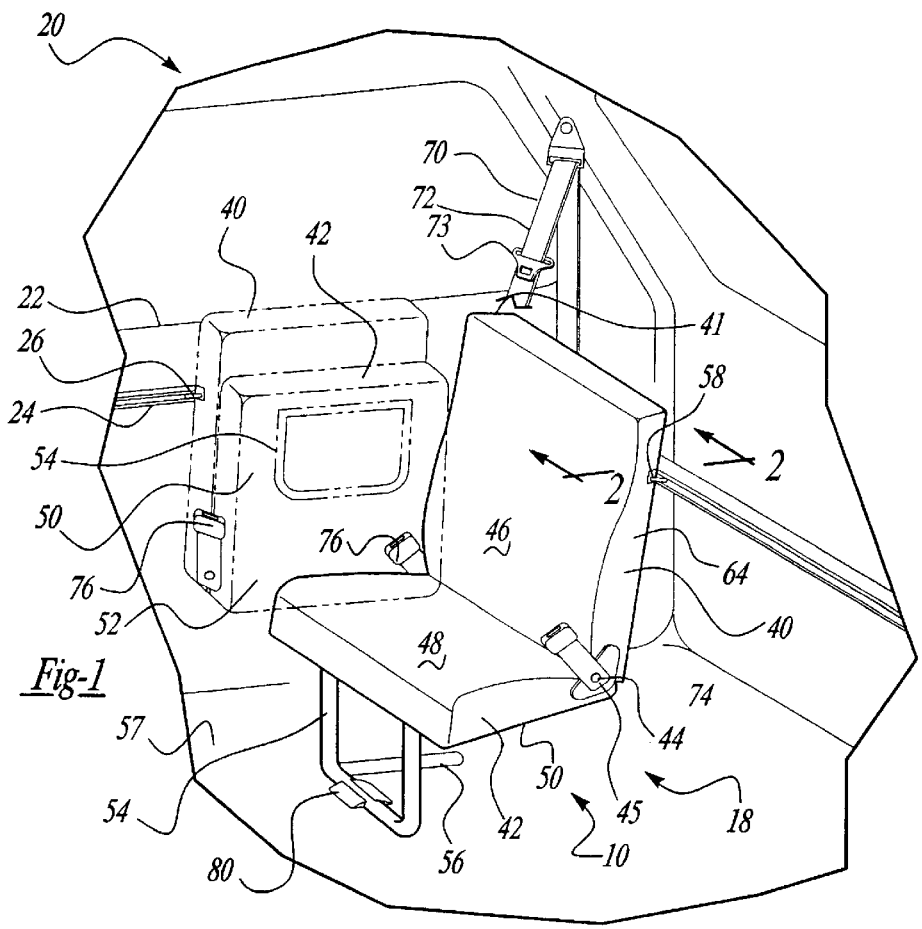
FIG. 1 is a perspective view showing the seat system of the present invention within a motor vehicle in a forward facing use position and a stowed position along the vehicle side wall.
Figure 2:
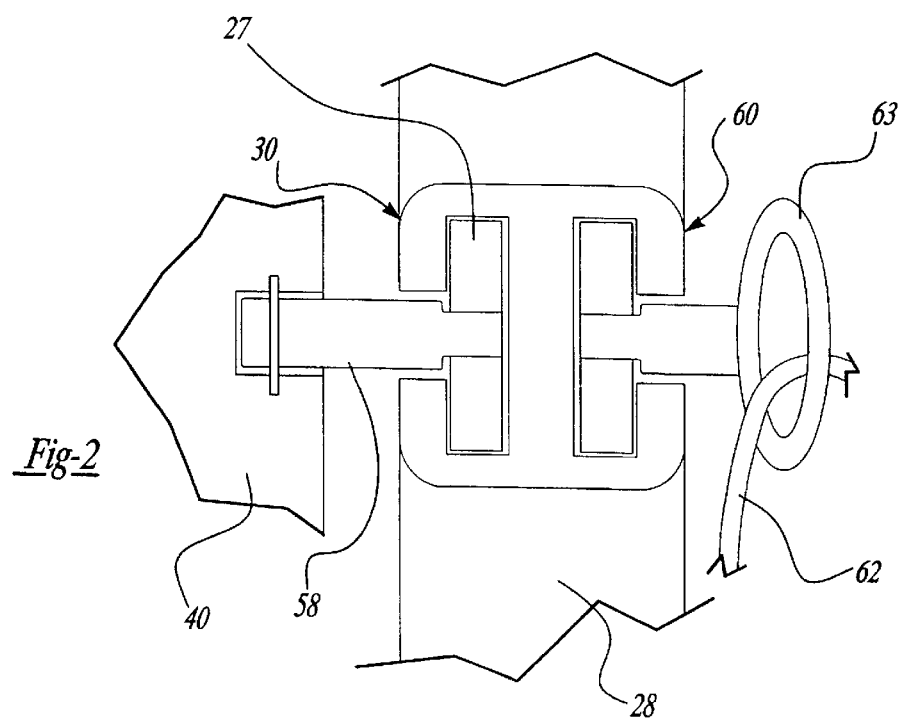
FIG. 2 is a side view as seen from substantially the line 2—2 in FIG. 1.
Figure 3:
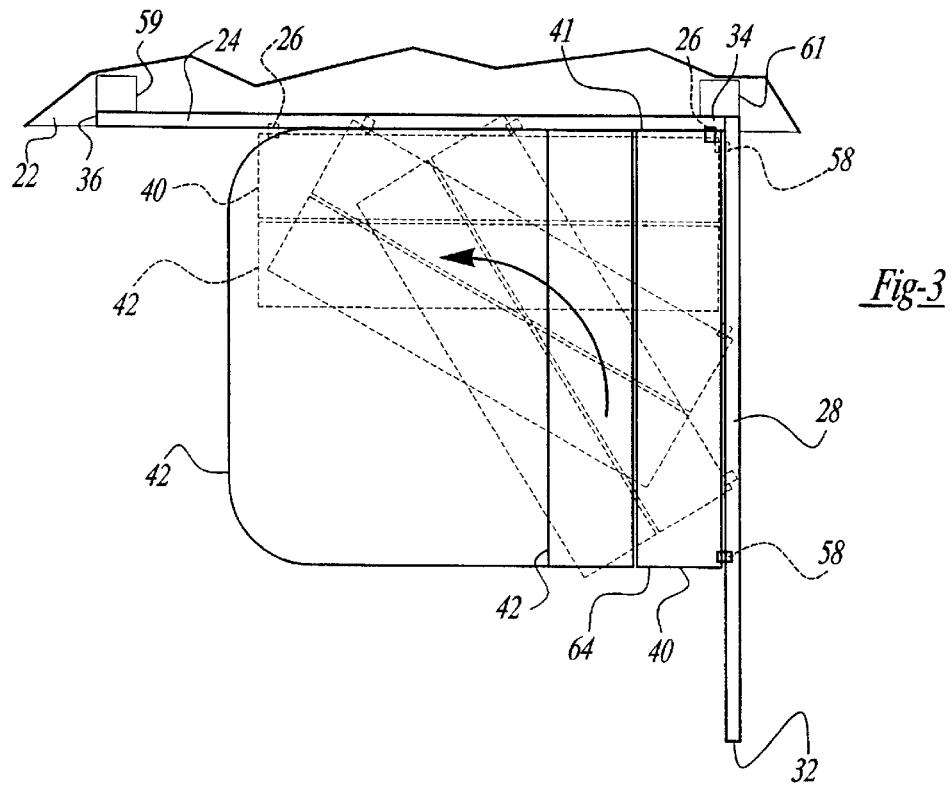
FIG. 3 is a plan view showing movement of the seat within the vehicle between its forward facing use position and side stowed position.

The following description of the preferred embodiment is merely exemplary in nature and is in no way intended to limit the invention or its application or uses.

The present invention is a flexible seat system which may be incorporated in a vehicle where flexibility between providing passenger seating positions and open space for cargo or other purposes is important. While the description of the invention uses an automotive vehicle, such as a sport utility vehicle or minivan, it will be recognized by those skilled in the art that this invention can also be used in boats, campers, recreational vehicles, airplanes, or any other vehicle where this flexibility is desirable.

As shown in the Figures, the seating system 10 of the present invention is installed in a vehicle 20. The vehicle 20 has a side wall 22 to which a side wall track 24 is attached. The side wall track 24 extends in a generally horizontal direction. The track 24 may be extruded, stamped or formed of a metal, plastic, resin or composite material. The track 24 is provided with a cross section which will capture a first slidable bearing device 26. In the embodiment shown, the track 24 has a generally C shaped section and the slidable bearing device 26 includes a wheel 27 inserted within the C section of the track. Other track cross sections and complementary slidable bearing devices can be readily interchanged for that described.

A cross vehicle beam 28 extends from the side wall 22 to a structural attachment at a distal end 32 of the beam 28. The structural attachment in the preferred embodiment is the oppositely positioned vehicle side wall (not shown) but could be a wide variety of the structural elements depending upon what type of vehicle and where in the vehicle the present invention is utilized. The cross vehicle beam 28 includes a cross vehicle track 30 constructed similar to the track 24 in material and section. The beam 28 can be removable or fixed in position and is generally coordinated with one end of the side wall track 24, preferably the rear end 34 of the side wall track.

The seat system 10 includes a seat 18 having a seat back 40 and a seat bottom 42. The seat bottom 42 is pivotally connected at the rear end of the seat bottom 42 to the lower end of the seat back 40 by a pivot 44. The seat back 40 has a forward facing use position shown in FIG. 1 in which the seat back extends laterally of the vehicle and the seat back forms a front facing seating surface 46. The seat bottom 42 extends forwardly from the seat back in a generally horizontal use position in which the top of the seat bottom forms a generally horizontal seating surface 48. The seat bottom 42 can be rotated about the pivot 44 to an upright stowed position in which the seat bottom 42 overlies the seat back 40 with the seating surfaces 46, 48 facing one another. A locking device is preferably provided to lock the seat bottom 42 in its upright stowed position. The lock 45 can be included at the pivot 44 to prevent unintended downward rotation of the seat bottom to its use position. The lock 45 can be part of the hinge mechanism which forms the pivot 44. The lock 45 may be similar to a power recliner to move the seat bottom between its use and stowed positions. Such a power drive device would hold the seat bottom in place in both the use and stowed positions. Alternatively, the seat bottom 42 can be latched at its forward or upper end to the seat back by a latch or a connecting strap to hold the seat bottom in the upright stowed position.

In a preferred embodiment, the seat bottom and seat back have a combined thickness of 6 to 8 inches. The thickness can vary above or below this dimension depending upon requirements for seat comfort and cargo carrying capacity. Further the lower surface 50 of the seat bottom 42 may have a decorative cover 52 attached thereto. Decorative cover 52 may have a sew style to match the remainder of the interior or may be a hard protective shell to prevent cargo from damaging the seat bottom.

The first slidable bearing device 26 is attached to the outboard edge 41 of the seat back 40 which is adjacent to the vehicle side wall 22. A second slidable bearing device 58 is attached to seat back 40 near an inboard edge 64 of seat back 40. The second slidable bearing device 58 is captured in and moves along the cross track 30.

As shown in the drawings, the seat back and seat bottom can move from a laterally extending position in the vehicle 20 to a position parallel to side wall 22. The path of the arc which the seat 18 travels in is defined by the first slidable bearing device 26 moving along the side wall track 24 while at the same time the second slidable bearing device 58 moves along the cross track 30. The seat 18 is stowed in the vehicle along the vehicle side wall 22 with the seat bottom 42 rotated to the upright stowed position overlying the seat back 40. The slidable bearing devices 26, 58 are pinned to the seat back so that the slidable bearing devices can travel along their respective tracks while the seat 18 rotates approximately 90° about a vertical axis relative to the vehicle body. The side wall track 24 can include a latch mechanism 59 at the rear end 34 to hold the slidable bearing device 26 in place in the seat back forward facing use position. A latch can also be provided in the cross track and at the front end of the side wall track.

The seat 18 can be used when it is along the vehicle side wall 22 by rotating the seat bottom 42 downward to its generally horizontal use position extending from the seat back 40. With the seat back 40 along the vehicle side wall, seat 18 is a side facing seat within the vehicle.

A leg or stanchion 54 is pivotally coupled to the seat bottom 42 and lowers to engage a receptacle 56 located in the floor 57 of the vehicle 20. Stanchion 54 provides support for the seat bottom 42. Receptacle 56 is L-shaped whereby the stanchion 54 can engage one leg of the receptacle 56 when the seat 18 is in the front facing position and engage the other leg of the receptacle when the seat back is in the side facing position along the side wall 22. A latch device 80 can be included in the floor to hold the stanchion 54 in place. The latch 80 can be manually operated or it can be a power device, remotely actuated. A latch 80 can be provided in each leg of the L-shaped receptacle 56.

The movement of seat 18 between the front facing and side facing positions can be achieved by attaching power drives 59, 61 to the slidable bearing devices 26, 58 which force the bearing devices along the tracks 24, 30, respectively. In the preferred embodiment, a cable drive system would be attached to the bearing device 26 and extend toward the front end 36 of the side wall track 24. When power is applied to a motor of the drive 59, the cable would draw the slidable bearing device 26 toward the front end 36 of the track 24, thereby moving seat 18 into the side facing position. Other drive systems such as spur gears, rack and pinions, stepper motors and similar devices could be utilized with equal results for moving the bearing device 26 along sidewall track 24. The power drive 61 is similarly constructed and mounted to the cross track 30. With a power drive in the tracks, a power drive at the seat bottom pivot and power release of the stanchion, the seat can be moved to its stowed position remotely by power actuation.

In the preferred embodiment, the seat 18 only extends laterally across the vehicle approximately half of the vehicle width. A second identical seat 18 can be provided adjacent the first seat 18 forming a seat row across the entire width of the vehicle. The second seat will use the same cross track 30 within the beam 28. Another side wall rail is provided in the opposite side wall of the motor vehicle. The two seats may be of equal or unequal widths.

If the cross track 30 is integrated to the rear end of the side wall track 24, the second bearing device 58 can be movable from the cross track 30 to the side wall track 24. This will enable the cross beam 28 to be made removable from the vehicle while the seat 18 remains mounted to the side wall track 24. In addition, the side wall track can extend forward along the side wall at greater length then the width of the seat 18 so that the seat 18 can be moved forward along the side wall to a forward stowed position immediately behind the next forward seat row. This can provide a greater width in the rear of the vehicle for carrying large items.

The cross beam 28 also incorporates a channel 60 that allows for the attachment of modular convenience features to the vehicle 20, such as a tie-down ring 63. Various items can be attached to the tie-down ring, such as a cargo netting 62 or pouch. Other modular features can include, but are not limited to, a rear package shelf, a vertically positioned security screen, a cross-vehicle storage bag made of a woven fabric or mesh-type net or a wide variety of other convenience items. The channel 60 can also be used to secure items such as bicycles in the rear of the vehicle.

Figure 4:
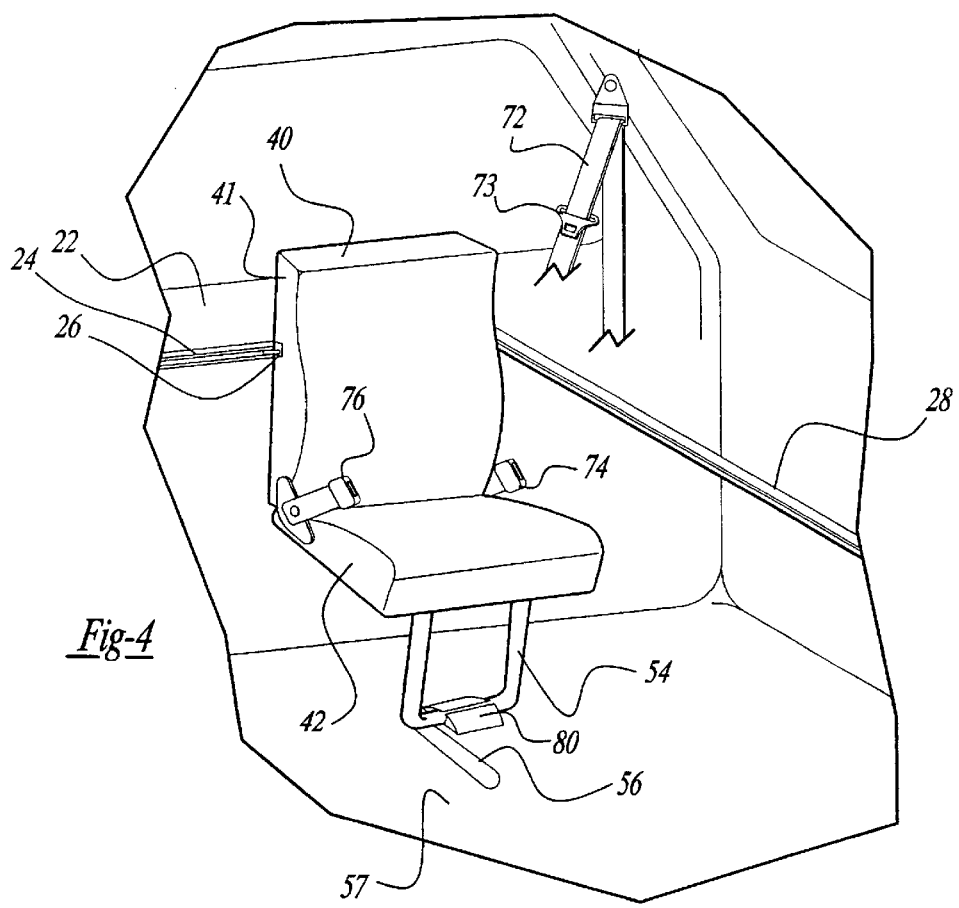
FIG. 4 is a perspective view of the seat system within a vehicle like FIG. 1 with the seat shown in a side facing use position.

As shown in FIG. 1, an occupant positioned in seat 18 in the forward facing use position can utilize a restraint system 70. As shown, restraint system 70 has a belt webbing 72 mounted to the D-pillar or the roof the vehicle 20 with a tongue 73 on the webbing 72. In the forward facing use position of the seat 18, an occupant draws the webbing 72 over his or her right shoulder and attaches it to a buckle end 74 located toward the center of the vehicle on the inboard edge of the seat 18. Further, the restraint system 70 can be utilized when the seat 18 is in the side facing position with the seat back 40 parallel to the side wall 22 as shown in FIG. 4. In this position, the occupant draws the webbing 72 over his or her left shoulder and attaches it to a buckle end 76 located in a position forward of the occupant on the outboard edge 41 of the seat 18. It is further contemplated by the Applicant that the buckle ends maybe integrated directly into the vehicle and not attached directly to the seat 18. By providing the seat 18 with webbing buckle ends 74, 76 on each side of the seat 18, identical seat components can be used for either the left or right side of a vehicle body.

The foregoing discussion discloses and describes the preferred embodiment of the present invention. One skilled in the art will readily recognize from such discussion, and from the accompanying drawings that various changes, modifications and variations can be made therein without departing from the true spirit and fair scope of the invention.

I claim:

1. A Seat system for a vehicle having a body with an interior space and a longitudinally extending upright side wall, said seat system comprising:
   a seat back having inboard and outboard edges and upper and lower ends, said seat back extending laterally of the vehicle body generally perpendicular to the side wall with said outboard edge being adjacent the side wall and said inboard edge being spaced laterally from the side wall in a forward facing use position;
   a seat bottom having inboard and outboard edges and front and rear ends, said seat bottom being coupled at said rear end to said lower end of said seat back and extending generally horizontally from said seat back lower end in a seat bottom use position;
   a hinge mechanism coupling said seat bottom to said seat back for rotation of said seat bottom to a seat bottom stowed position generally upright and overlaying said seat back; and
   track means adapted for mounting said seat back to the vehicle body for slidable movement of said seat back from said forward facing use position to a stowed position along the side wall in which said seat back extends longitudinally of the vehicle.

2. The seat system as defined in claim 1 wherein said hinge mechanism enables rotation of said seat bottom to said seat bottom use position when said seat back is along said side wall whereby said seat back and said seat bottom form a side facing seat.

3. The seat system as defined in claim 2 further comprising a lock to hold said seat bottom in said seat bottom stowed position.

4. The seat system as defined in claim 1 further comprising a leg extending downward from said seat bottom for supporting said seat bottom in a spaced relation above the floor of the vehicle when said seat bottom is in said seat bottom use position.

5. The seat system as defined in claim 1 wherein said track means comprises:
   a first track mounted to the vehicle side wall and extending longitudinally of the vehicle and having front and rear ends with said seat back being coupled to said first track at said outboard edge of said seat back by a first bearing device slidable along said first track; and
   a second track mounted to the vehicle body and extending laterally of the vehicle, said second track having opposite ends with said seat back being coupled to said second track at said inboard edge of said seat back by a second bearing device slidable along said second track.

6. The seat system as defined in claim 5 further comprising a latch in said first track to hold said seat back in said forward facing use position.

7. The seat system as defined in claim 5 wherein said first track extends forward from said second track.

8. The seat system as defined in claim 1 further comprising a power drive for moving said seat back between said forward facing use position and said stowed position.

9. A seat system for a vehicle having a body with an interior space and a longitudinally extending upright side wall; said seat system comprising:
   a first track adapted to be mounted to the side wall and extending longitudinally of the vehicle and having front and rear ends;
   a second track adapted to be mounted to the vehicle body and extending laterally of the vehicle, said second track having opposite ends;
   a seat having a seat back with inboard and outboard edges and upper and lower ends, said seat back having a use position in which said seat back extends laterally of the vehicle body generally perpendicular to the side wall with said outboard edge being adjacent said first track and said inboard edge being spaced laterally from said first track adjacent said second track, and a seat bottom having inboard and outboard edges and front and rear ends, said seat bottom being coupled at said rear end to said lower end of said seat back by a hinge mechanism to rotate between a use position in which said seat bottom extends generally horizontally from said seat back and a stowed position in which said seat bottom is upright and overlaying said seat back;
   a first bearing device coupling said seat back at said outboard edge to said first track and being slidable therein; and
   a second bearing device coupling said seat back at said inboard edge to said second track and being slidable therein whereby said seat back is movable from said forward facing use position to a stowed position generally parallel to said side wall by moving said first and second bearing devices along said first and second tracks.

10. The seat system as defined by claim 9 wherein one of said opposite ends of said second track is adjacent one of said ends of said first track.

11. The seat system as defined by claim 9 wherein one of said opposite ends of said second track is adjacent said rear end of said first track whereby said first bearing device moves forward along said first track as said seat back moves from said forward facing use position to said stowed position.

12. The seat system as defined by claim 9 further comprising a lock to hold said seat bottom in said stowed position.

13. The seat system as defined by claim 12 wherein said lock is part of said hinge mechanism.

14. The seat system as defined by claim 9 further comprising a latch in said first track to hold said first bearing device in said first track in said seat back forward facing use position.

15. The seat system as defined by claim 9 wherein said second track includes a cross body beam extending laterally of said vehicle body.

16. The seat system as defined by claim 15 wherein said cross body beam is configured to mount convenience features thereto.

17. The seat system as defined by claim 9 further comprising a leg coupled to said seat bottom and extending from said seat bottom to a floor of the vehicle for supporting said seat bottom in a spaced relation above the vehicle floor.

18. The seat system as defined by claim 9 wherein said first and second tracks are located adjacent said upper end of said seat back.

19. The seat system as defined by claim 9 further comprising a power drive mechanism coupled to said first track and said first bearing device to move said first bearing device along said first track.

20. The seat system as defined by claim 9 further comprising a power drive mechanism coupled to said second track and said second bearing device to move said second bearing device along said second track.

21. The seat system as defined by claim 9 wherein said hinge mechanism is operable to rotate said seat bottom to said generally horizontal seat bottom use position extending from said lower end of said seat back when said seat back is in said seat back stowed position forming a side facing seat for use in the vehicle body.

22. The seat system as defined by claim 9 further comprising a restraint system for a seat occupant including a belt webbing attached to the side wall of the vehicle adjacent said outboard edge of said seat back when said seat back is in said seat back forward facing use position and having a tongue attached thereto, and a webbing buckle end mounted to said seat bottom at said inboard edge for reception of said tongue therein to form a lap belt for the seat occupant.

23. The seat system as defined by claim 22 further comprising a second webbing buckle end attached to said seat bottom at said outboard edge.

24. A seating system for a vehicle having a body with an interior space and left and right laterally spaced longitudinally extending upright side walls; said seating system comprising:

a first side wall track adapted to be mounted to the left side wall and extending longitudinally of the vehicle and having front and rear ends;

a second side wall track adapted to be mounted to the right side wall and extending longitudinally of the vehicle and having front and rear ends;

a cross track adapted to be mounted to the vehicle body and extending laterally of the vehicle between the left and right side walls;

left and right seats each having a seat back with inboard and outboard edges and upper and lower ends, said seat back having a use position in which said seat back extends laterally of the vehicle body generally perpendicular to the side walls with said outboard edge of said left seat back being adjacent said left side wall track and said outboard edge of said right seat back being adjacent said right side wall track, said inboard edges of said seat backs being spaced laterally from said respective side wall tracks adjacent said cross track and adjacent to one another, and each seat having a seat bottom with inboard and outboard edges and front and rear ends, said seat bottoms being coupled at said rear ends to said lower ends of said seat backs by hinge mechanisms to rotate between a use positions in which said seat bottoms extend generally horizontally from said seat backs and stowed positions in which said seat bottoms are upright and overlaying said seat backs;

a first bearing device coupling each said seat back at said outboard edges thereof to said respective side wall tracks and being slidable therein; and a second bearing device coupling each said seat back at said inboard edges thereof to said cross track and being slidable therein whereby said seat backs are movable from said forward facing use positions to stowed positions generally parallel to said left and right side walls respectively by moving said first and second bearing devices along said side wall and cross tracks.

25. The seating system as defined in claim 24 wherein each of said seats further comprises a leg coupled to said seat bottoms and extending from said seat bottoms to a floor of the vehicle for supporting said seat bottoms in a spaced relationship above the vehicle floor.

26. The seat system as defined by claim 24 wherein said hinge mechanisms are operable to rotate said seat bottoms to said generally horizontal seat bottom use positions extending from said lower ends of said seat backs when said seat backs are in said seat back stowed positions forming side facing seats for use in the vehicle body.

* * * * *